United States Patent
Kitano et al.

(10) Patent No.: US 6,741,464 B2
(45) Date of Patent: May 25, 2004

(54) LIQUID COOLING SYSTEM AND PERSONAL COMPUTER USING THEREOF

(75) Inventors: Makoto Kitano, Tsuchiura (JP); Takashi Naganawa, Chiyoda (JP); Yuji Yoshitomi, Chiyoda (JP); Rintaro Minamitani, Tsukuba (JP); Shigeo Ohashi, Tsuchiura (JP); Noriyuki Ashiwake, Tsuchiura (JP); Yoshihiro Kondo, Chiyoda (JP); Tsuyoshi Nakagawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 279 days.

(21) Appl. No.: 09/921,925

(22) Filed: Aug. 6, 2001

(65) Prior Publication Data

US 2002/0075645 A1 Jun. 20, 2002

(30) Foreign Application Priority Data

Dec. 20, 2000 (JP) .................................... 2000-386263

(51) Int. Cl.$^7$ ................................................ G06F 1/20
(52) U.S. Cl. .................. 361/687; 361/700; 165/104.33; 165/80.3; 62/259.2; 174/15.2
(58) Field of Search .................... 361/687, 689–699, 361/704, 700; 165/80.3, 80.4, 185, 104.33, 122–126; 174/15.2; 62/259.2

(56) References Cited

U.S. PATENT DOCUMENTS

| | | | | |
|---|---|---|---|---|
| 4,810,168 A | * | 3/1989 | Nogami et al. | 417/2 |
| 5,203,399 A | * | 4/1993 | Koizumi | 165/104.33 |
| 5,646,824 A | * | 7/1997 | Ohashi et al. | 361/699 |
| 5,757,615 A | | 5/1998 | Donahue et al. | |
| 6,519,148 B2 | * | 2/2003 | Nakagawa et al. | 361/687 |
| 6,549,408 B2 | * | 4/2003 | Berchowitz | 361/700 |
| 6,556,439 B2 | * | 4/2003 | Shibasaki | 361/687 |

* cited by examiner

Primary Examiner—Lisa Lea-Edmonds
(74) Attorney, Agent, or Firm—Antonelli, Terry, Stout & Kraus, LLP

(57) ABSTRACT

A liquid cooling system for cooling a high heat generating body, such as a semiconductor element or the like, of the type used in an electronic apparatus that is small and thin in size, or in a personal computer equipped with such a structure therein. The system has a pump of the reciprocal movement type, a heat receiving jacket, a heat radiation pipe, and a connector pipe for connecting those parts with one another so as to form a closed loop filled with a cooling liquid. In the system, $\Delta Vs$ is equal to or greater than $\Delta Vp$, wherein the inner volume change when the pump emits pulsation therefrom is $\Delta Vp$, the pressure caused by the volume change is P, and the volume change due to the pressure P that occurs in flow passage of the cooling liquid $\Delta Vp$ other than within the pump, is $\Delta Vs$.

22 Claims, 8 Drawing Sheets

LIQUID COOLING SYSTEM AND PERSONAL COMPUTER USING THEREOF

BACKGROUND OF THE INVENTION

The present invention relates to a liquid cooling system for cooling at body that is generating heat, and, in particular, to a liquid cooling system that is suitable for use in a small and/or thin electronic device.

Semiconductor devices that are used in electronic devices, such as a computer, etc., generate heat during their operation. In particular, high-integrated semiconductor devices, in recent years, have produced an increased amount of heat generation. Since the semiconductor device will be damaged if the temperature thereof exceeds a certain value, cooling is necessary to prevent damage to the semiconductor device having a large amount of heat generation during use.

For cooling the semiconductor device of an electronic apparatus, there are various known techniques, such as thermal conduction or air-cooling, or the use of a heat pipe, or liquid cooling.

Cooling by thermal conduction can be achieved by using materials having a large thermal conductivity along the heat radiation route, extending from the semiconductor device to the outside of the electronic apparatus. This method has been suitable for a so-called compact electronic apparatus, in which heat generation is relatively small, such as a notebook-type personal computer.

With cooling by the use of forced air, an air blower or fan is provided inside the electronic apparatus, thereby achieving a cooling of the semiconductor device therein by forced circulation of air thereon. This method is adopted widely for the cooling of semiconductor devices having a higher amount of heat generation, and it also has been applied to a personal computer by making the air blower small and thin in size.

Cooling with the use of a heat pipe, involves carrying heat out the outside of the electronic apparatus by means of coolant enclosed within a pipe, as described in Japanese Patent Laying-Open No. Hei 1-184699 (1989), and Japanese Patent Laying-Open No. Hei 2-244748 (1989), for example. With this method, since there is no part capable of consuming electric power therein, such as an air blower or fan, such a cooling device has good efficiency, i.e., it increases the cooling through thermal conduction. However, with this method, there is a limit to the amount of heat that can be transferred.

Cooling by means of a liquid coolant is suitable for the cooling of a semiconductor device which generates a large amount of heat, and such a cooling device is described, for example, in Japanese Patent Laying-Open No. Hei 5-1335454 (1993), Japanese Patent Laying-Open No. Hei 6-97338 (1994), Japanese Patent Laying-Open No. Hei 6-125188 (1994), and Japanese Patent Laying-Open No. Hei 10-213370 (1998). However, such a cooling system using a liquid coolant has been restricted as to its field of utilization, such as to a large-scale computer. This is because the cooling system using a liquid coolant requires a large number of parts, such as a pump, a pipe system, heat radiation fins, etc., which are used exclusively for cooling, and so the apparatus comes to be large in size. Thus, it is difficult to maintain a satisfactory reliability when using liquid for cooling compared to other methods. It is also one of the reasons why, on the commercial market, no semiconductor device requiring such a high level of cooling employs a liquid cooling system, other than in the field of large-scale computers.

A technique for adapting liquid cooling to a small-sized apparatus, including a notebook-sized personal computer, is described in Japanese Patent Laying-Open No. Hei 6-266474 (1994). In this cooling device, a header attached onto the semiconductor device and a heat radiation pipe separately located from it are connected with each other by means of a flexible tube to form a cooling system, wherein heat is transferred through the liquid coolant flowing therein, thereby cooling the semiconductor device.

However, there has been a remarkable increase in the heat generation produced from semiconductor devices which are used in electronic devices, such as a personal computer, a server computer, a work station, etc., in recent years, with the result that adoption of such conventional technique for cooling is no longer sufficient in connection with electronic apparatuses that are required to be small and thin in size, in particular, such as a notebook-type personal computer.

SUMMARY OF THE INVENTION

An object of the present invention, therefore, is to provide a liquid cooling system that is able to efficiently cool down a heat generating body in which high heat is generated, such as a semiconductor device or element of the type which is used in an electronic apparatus that is small and thin in size, and also to provide a personal computer equipped with such a cooling system.

The object, as mentioned above, according to the present invention, is accomplished by the provision of a liquid cooling system of superior efficiency, which is small and thin in size, or by a personal computer equipped with such a liquid cooling system, being peculiar to the personal computer, which is small and thin in the size thereof.

A pump is necessary for circulation of liquid in a liquid cooling system; however, with a pump of rotational type, which is typically used, it is impossible to realize, in particular, a personal computer that is ultra-small and thin, and has a low electric power consumption, as well. For this reason, it is more effective to use a pump which operates by pressurizing the liquid coolant through reciprocal movement of a member. However, even when using such a pump of the reciprocal type, it is necessary to satisfy certain conditions for the purpose of achieving a system of low electric power consumption, while enabling cooling effectively, as will be described below.

In more detail, according to the present invention, there is provided a liquid cooling system, comprising: a pulsation-type pump for supplying cooling liquid; a heat receiving jacket supplied with said cooling liquid and positioned to receive heat generated from a heat generating body; a heat radiation pipe for radiating heat which is supplied by the cooling liquid passing through said heat receiving jacket; and a passage for circulating the cooling liquid passing through said heat radiation pipe into said pump, wherein said cooling liquid circulates within a closed flow passage. In this cooling system, $\Delta Vs$ is equal to or greater than $\Delta Vp$, assuming that the inner volume change when said pump emits a pulsation is represented by $\Delta Vp$, the pressure accompanying said volume change is represented by P, and the volume change due to said pressure P in the flow passage of the cooling liquid, other than in a portion of said pump, is represented by $\Delta vs$.

Further, for example, said pump emits a pulsation by the reciprocal movement of a member within the pump, and the reciprocal movement of the member in said pump is caused by bending or flexure of a diaphragm. This diaphragm itself, or a driving source of the diaphragm, is preferably formed with a piezo element, from the viewpoint achieving a of small-size, low electric power consumption and low noise, etc. With this, it is possible to maintain a substantial amount of cooling liquid in the system, even in a computer that is small and thin in size, thereby to obtain effective cooling.

Also, a rubber pipe or a resin pipe may be used as at least a portion of the connector pipe which forms the flow passage for carrying said cooling liquid therein, and the surface of said resin or rubber pipe is coated with a metal film or a resin sheet covered with a metal film, thereby suppressing diffusion of the cooling liquid through the rubber and the resin into the atmosphere and enabling conduction of heat with efficiency, as well.

The liquid cooling system defined above, preferably, further comprises an accumulator, in which the volume change of the cooling liquid therein due to said pressure P is equal to or greater than $\Delta Vp$, from a viewpoint of management of the pressure.

Further, the accumulator has a structure such that it retains the cooling liquid therein and is able to vary the amount of fluid it retains. For example, it may be one that varies the retained amount by self deformation. Or, alternatively, it may have a structure such that it holds a gas within a chamber thereof.

The accumulator mentioned above may be made of a flexible material, such as rubber or resin, for example, thereby being movable in response to a change in pressure. Or, it may be constructed by the use of metal bellows. Or, it may employ a piston mechanism therein.

Further, in the liquid cooling system as described above, it is preferable that said cooling liquid is pressurized at a pressure that is equal to or higher than that of the atmosphere.

Also, in the liquid cooling system as described above, the accumulator has a housing with a supply opening through which said circulating cooling liquid is received and a discharge opening for discharging said cooling liquid therethrough, and a chamber that maintains gas and said cooling liquid therein. It is preferable for said accumulator to be disposed in series with the heat receiving jacket or/and the heat radiation pipe in the circuit of the cooling system.

Further, in a personal computer having such a liquid cooling system, according to the present invention, there is a semiconductor element; a signal input portion; a display device; and a liquid cooling system, including a pulsation-type pump for supplying cooling liquid, a heat receiving jacket supplied with said cooling liquid and positioned to receive heat generated within said semiconductor element, a heat radiation pipe for radiating heat which is supplied by the cooling liquid passing through said heat receiving jacket, and a passage for circulating the cooling liquid passing through said heat radiation pipe into said pump, wherein said cooling liquid circulates with in a closed flow passage. In the liquid cooling system, $\Delta Vs$ is equal to or greater than $\Delta Vp$, assuming that the inner volume change when said pump emits a pulsation therefrom is represented by $\Delta Vp$, the pressure accompanying said volume change is represented by P, and the volume change due to said pressure P, in the flow passage of the cooling liquid, other than in a portion of said pump, is represented by $\Delta vs$.

Furthermore, in a notebook-type personal computer, there is provided a main body, including a semiconductor element and a signal input portion; a display device, having a display portion connected with said main body through a movable mechanism; and a liquid cooling system including a pulsation-type pump for supplying cooling liquid, a heat receiving jacket disposed within said main body and supplied with said cooling liquid and positioned to receive heat generated within said semiconductor element, a heat radiation pipe disposed on a back surface of said display portion of said display device for radiating heat which is supplied by the cooling liquid passing through said heat receiving jacket, and a passage for circulating the cooling liquid passing through said heat radiation pipe into said pump, wherein said cooling liquid circulates within a closed flow passage. The cooling liquid system further includes an accumulator which has a supply opening for supplying said circulating cooling liquid therethrough, and a discharge opening for discharging said cooling liquid therethrough, and the accumulator maintains gas and said cooling liquid therein, wherein amount of the cooling liquid maintained within said accumulator varies in response to emission of a pulsation from said pump.

Moreover, in a detailed embodiment according to the present invention, there is provided a personal computer including a semiconductor element; a signal input portion; a display device; and a liquid cooling system, including an emission pump for supplying cooling liquid in the form of a pulsation by using the reciprocating movement of a diaphragm having a piezo element, a heat receiving jacket supplied with said cooling liquid and positioned to receive heat generated within said semiconductor element, a heat radiation pipe for radiating heat which is supplied by the cooling liquid passing through said heat receiving jacket; an accumulator having a housing with a supply opening for supplying said circulating cooling liquid therethrough and a discharge opening for discharging said cooling liquid therethrough, and a chamber for maintaining gas and said cooling liquid therein, and a passage for circulating the cooling liquid passing through said heat radiation pipe into said pump, wherein said cooling liquid circulates within a closed flow passage, and the amount of the cooling liquid maintained within said accumulator varies in response to emission of a pulsation from said pump.

Next, an explanation will be given of the concept of the present invention with reference to FIGS. 13 to 15. The flow passage in the liquid cooling system according to the present invention is shown diagrammatically in the FIG. 13. The flow passage is constructed with a pump 1 and connector pipes 3, and is filled up with a cooling liquid. The connector pipe 3 is connected to both an outlet and an inlet of the pump, thereby forming a closed loop. The pump 1 is constructed with a housing having a diaphragm 8 mounted for reciprocal movement therein and check valves 9a and 9b. Now, considering a case where the diaphragm is moved from the dashed time position to the position of the solid line, since the cooling liquid within the pump housing is pressurized, the check valve 9b is opened. Repeating this operation continuously, causes a fluid pulse to be emitted periodically from the pump, causing the cooling liquid to circulate along the route thereof. In this instance, for the cooling liquid to move in the direction of the arrows, with the check valve 9a closed, it is necessary for a portion or the entire connector pipe 3 to expand, so that the cooling liquid within the pump is able to flow in that direction.

FIG. 14 shows a relationship between the flow rate Q of the pump and the pressure P. Herein, Pmax indicates the maximum pressure that is generated or developed when the exit of the pump is closed so that no cooling liquid flows therethrough, and Qmax represents the maximum flow rate when the exit of the pump is opened, so as to remove the pressure loss therefrom. In this graph, the relationship between the flow rate Q and the pressure P can be determined, so that the flow rate comes to be $Q_0$ when a pipe of pressure loss $P_0$ is connected, for example.

In the liquid cooling system according to the present invention, since the cooling liquid is circulated within the flow passage with the pulsation thereof, by use of such a reciprocating pump therein, the volume change $\Delta Vp$ in the pump housing due to supply of the pulsation (i.e., due to the reciprocating movement) can be obtained from Q/(number of vibrations f); therefore, the relationship between the volume change $\Delta Vp$ and the pressure P can be drawn as shown in FIG. 15. Also, since the pressure P applied on the pipe and the volume change $\Delta Vs$ in the pipe proportional to each other, the relationship comes to be indicated by a straight line (1), for example. In this instance., at a point where the straight line (1) and the characteristic curve of the pump cross, pressure $P_1$ and volume change $\Delta V_1$ can be determined. In a case of forming an open loop, the volume change is determined by the pressure loss $P_0$ of the pipe, thereby obtaining the volume change $\Delta V_0$, however if a rigid or hard pipe having small volume change therein is used, as indicated by (1), only the volume change of $\Delta V_1$ can be obtained, which is smaller than $\Delta V_0$. Accordingly, the flow rate is reduced, and, therefore, the cooling performance also is reduced. On the contrary, in a case where the volume change with respect to the pressure is large, as is indicated by (1), namely, in the case of using a soft pipe, since the volume change $\Delta V_0$ becomes large at the crossing point of the straight line (2) with the characteristic curve of the pump, the primary volume change can be obtained at $\Delta V_0$, and, therefore, it is possible to exhibit sufficient characteristics. Thus, if the volume change due to the reciprocal movement of the pump member is represented by $\Delta Vp$, the pressure caused by the volume change $\Delta Vp$ is represented by P, and the volume change of an expansible portion of the pipe when the pressure P is applied thereon is represented by $\Delta Vs$, it is possible to achieve those characteristics which allow the liquid cooling system to operate at high efficiency by making $\Delta Vs$ larger than $\Delta Vp$, and it is also possible for the system to operate with a low electric power consumption.

Also, in a liquid cooling system comprising two pumps for pressurizing the liquid by reciprocal movement of members therein, a heat receiving jacket which functions as a heat exchanger for cooling a heat generating body, a heat radiation pipe for conducting heat exchange with the outside air, and a connector pipe for connecting these parts, the two pumps, the heat receiving jacket and the heat radiation pipe are disposed in a closed loop by means of the connector pipe, and the cooling liquid fill up the two (2) pumps, the heat receiving jacket, the heat radiation pipe, and the connector pipe. Therefore, the same effect can be obtained by shifting the phase of the reciprocal movements of the members in the two pumps by 180°. Therefore, it is possible to achieve those characteristics or performances of the liquid cooling system which allow it to operate with high efficiency, thereby to provide a system of low electric power consumption as well.

BRIEF DESCRIPTION OF THE DRAWINGS

Those and other features, objects and advantages of the present invention will become more apparent from the following description when taken in conjunction with the accompanying drawings wherein.

DETAILED DESCRIPTION OF THE INVENTION

Hereinafter, embodiments according to the present invention will be fully explained with reference to the attached drawings.

Figure 1:
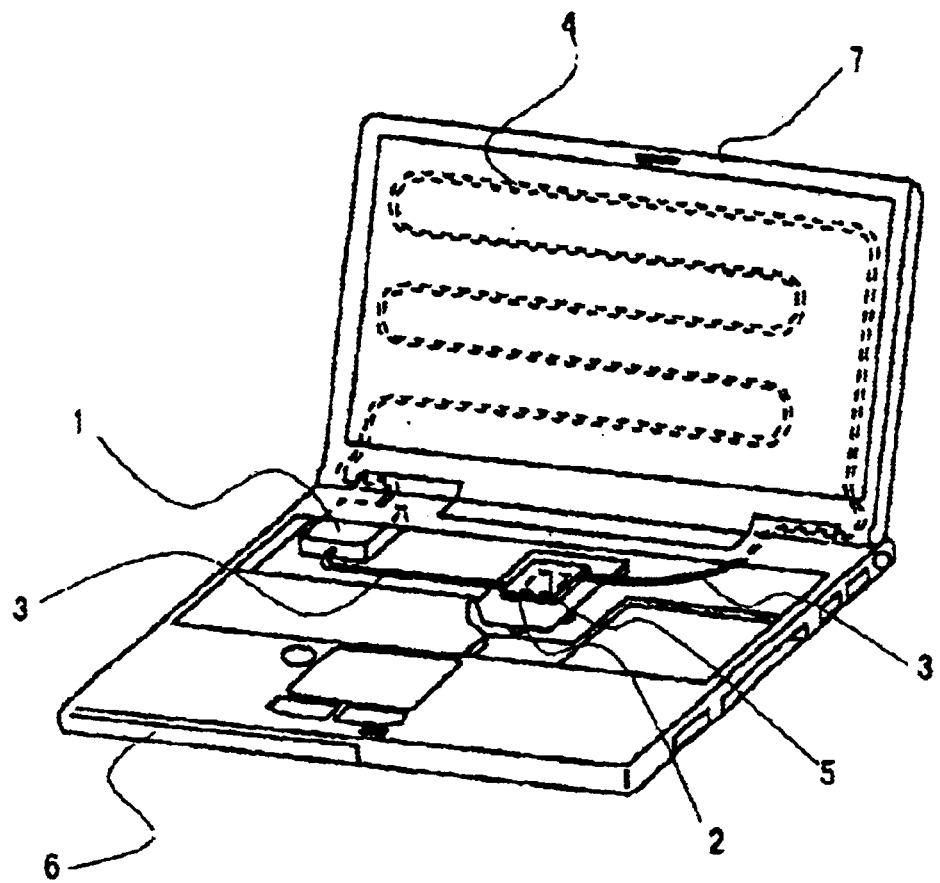
FIG. 1 is a perspective view of a notebook-type personal computer utilizing the liquid cooling system according to an embodiment of the present invention.

FIG. 1 diagrammatically shows a notebook-type personal computer using the liquid cooling system according to the present invention. To a semiconductor element or device 5 installed within a main body chassis or housing 6, there is connected a heat receiving jacket 2, in which a flow passage is provided. In the main body chassis 6, there is also provided a pump 1. Behind a display panel of a display device chassis 7, there is provided a heat radiation pipe 4. The pump 1, the heat receiving jacket 2, the heat radiation pipe 4 are connected with a connector pipe 3 in a closed loop-like manner to form a liquid cooling system, as shown in the figure, in which a cooling liquid is circulated.

Figure 2:
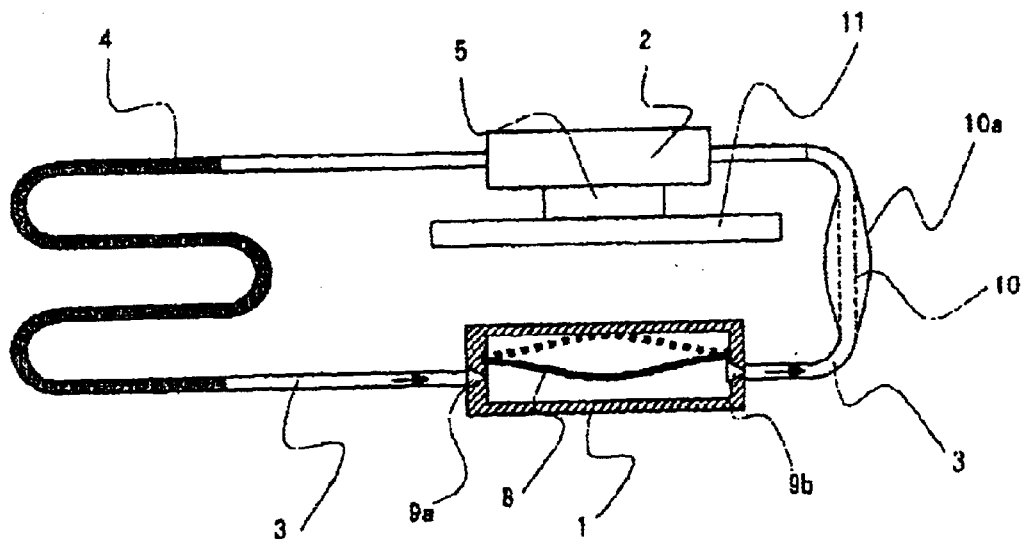
FIG. 2 is a diagram of the liquid cooling system according to an embodiment of the present invention.

FIG. 2 diagrammatically shows a first embodiment of the cooling system of the notebook-type personal computer shown in FIG. 1. The pump 1, the heat receiving jacket, which is in thermal contact with the semiconductor element 5 mounted on a print circuit board 11, and the heat radiation pipe 4 are connected by means of the connector pipes 3. The pump 1 is constructed with a housing having a diaphragm 8 that is mounted for reciprocal movement therein and check valves 9a and 9b. A portion of one of the connector pipes 3 is made of a soft material, so as to form an expansible portion 10. When the diaphragm 8 moves to the solid line position shown in the figure, the cooling liquid is suppressed, and the check valve 9b is opened. Then, due to the pressure of the cooling liquid, the expansible portion 10 is expanded to the shape 10a, therefore the cooling liquid moves out of the pumps in the direction of the arrow. Next, when the diaphragm comes back to the position shown by the broken line, since the pressure falls down, the check valve 9a is opened, and the cooling liquid within the connector pipe flows into the pump, while the expansible portion 10 returns back to its original shape, as indicated by the broken line. Repeating this operation causes the cooling liquid to circulate in the flow passage. The cooling liquid that is heated up in the heat receiving jacket 2 is cooled down in the heat radiation pipe 4, and it flows into the heat receiving jacket again via the pump 1. Repeating this operation makes it possible to effectively cool, even a semiconductor element having a large amount of heat generation. In particular, it is effective when it is applied to a personal computer having a semiconductor element which emits heat in an amount exceeding 30W.

According to the present embodiment, if the volume change due to the reciprocal movement of the pump member is $\Delta Vp$, the pressure occurring in response to the volume change $\Delta Vp$ is P, the volume change of the expansible portion 10 when the pressure P is applied is $\Delta Vs$, then $\Delta Vs$ is larger than $\Delta Vp$. Because of this, as was mentioned in the "Summary of the Invention", it is possible to achieve the characteristics or performances of the liquid cooling system with high efficiency, thereby to construct a system of low electric power consumption.

Measurement of the values mentioned above can be performed by the following manner, for example. The connector pipe 3 for passing the cooling liquid into the pump 1 is cut off just in front of the pump. A pressure gauge is provided just below the pump 1 on the downstream side of the pump 1. The cooling liquid is supplied from a source of cooling liquid to the pump 1, and then the pump 1 is driven. Then, the flow rate and the pressure "P0" are measured. Next, the amount of the volume change ($\Delta Vp$) mentioned above is obtained as the flow rate per one (1) revolution, from the frequency of pulsation (i.e., the reciprocal movement of the inner member) of the pump 1.

Next, the connector pipe, being cut off, is hermetically sealed at an end of the side opposing the pump 1, and the personal computer and so on are positioned so that the flow passage of the cooling liquid comes to be in as horizontal a position as possible. And then, a column of water is connected to the connector pipe, which is cut off, at the side of the pump, so as to measure the volume change $\Delta Vs$ and the pressure P1 in the flow passages of cooling water, other than in the pump, through a change in height of the water column and/or height thereof. On a P-V graph, Vs and P1 are plotted, and a straight line is drawn from the origin. In case of comparing the straight line with the plotted points of P0 and $\Delta Vp$, P0 has a larger value compared to both pressures on the $\Delta Vp$ curve.

While, the connector pipe 3 is provided with a portion that is flexible in the present embodiment, thereby allowing $\Delta Vs$ to be equal or greater than $\Delta Vp$, it is possible the make the connector pipe 3 flexible as a whole, so as to achieve the function of $\Delta Vs$ being equal to or greater than $\Delta Vp$. Also, such a material of the connector can be, for example, a rubber of low rigidity or a resin.

Figure 3:
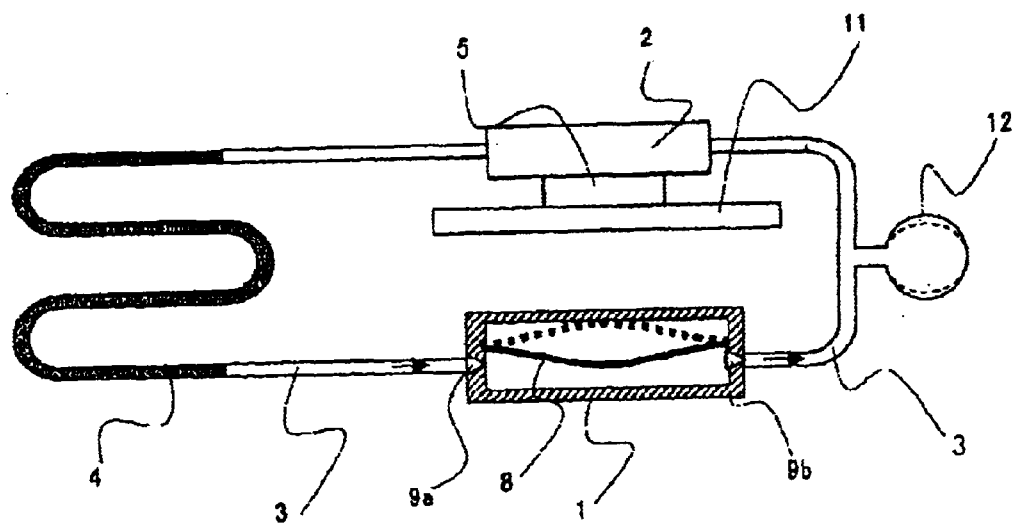
FIG. 3 is a diagram of the liquid cooling system according to another embodiment of the present invention.

FIG. 3 diagrammatically shows the liquid cooling system according to a second embodiment of the present invention. The structure of the system is almost the same as that of the first embodiment, however, in the place of the expansible portion 10 as used in the first embodiment, an accumulator 12 is attached to the connector pipe 3, which is filled up with the cooling liquid therein. In this figure, the solid lines and broken lines of the diaphragm 8 also correspond to the respective sizes of the accumulator 12. When the chamber of the pump 1 is compressed by means of the diaphragm 8, the check valve 9b is opened, and then the pressure is transferred to the accumulator 12, which is expanded, as shown by the solid lines. Due to this expansion, the cooling liquid can flow out of the pump in the direction of the arrow. In the present embodiment, the volume change of the accumulator 12 is $\Delta Vs$, which is caused when the pressure P is applied thereto, and $\Delta Vs$ is equal or greater than the $\Delta Vp$. Therefore, it is possible to achieve the characteristics or performances of the liquid cooling system with high efficiency, thereby to provide a system of low electric power consumption.

Figure 4:
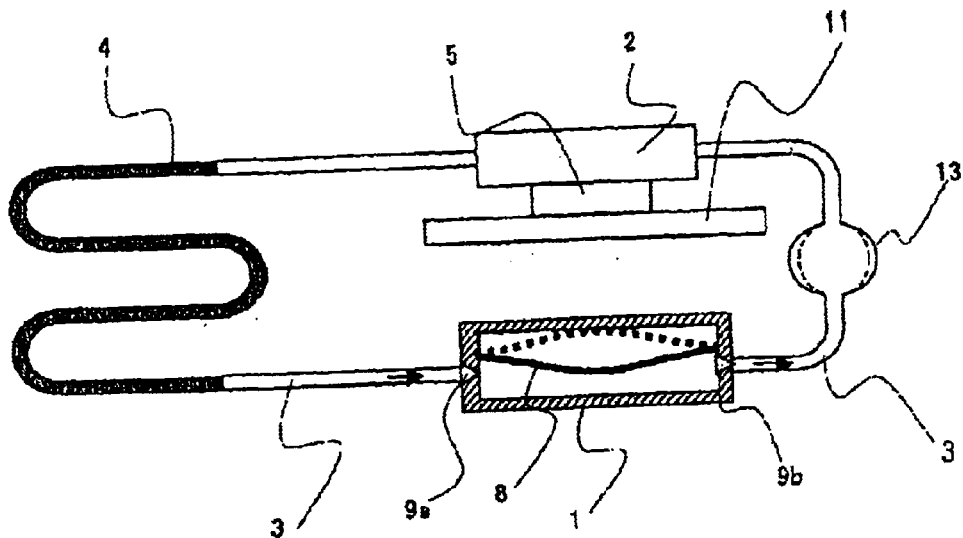
FIG. 4 is a diagram of the liquid cooling system according to a further embodiment of the present invention.

In the present embodiment, though the accumulator 12 is attached to the connector pipe 3 and branches off therefrom, the accumulator 13 may be connected to the connector pipe 3 in series, as shown in FIG. 4, so as to insert it into a closed loop, thereby obtaining the same effect, as far as $\Delta Vs$ being equal to or greater than $\Delta Vp$.

Also, in a case where the accumulator 12 or 13 has a structure that is changeable in size, i.e., becomes large or small in size, the material of the accumulator 12 or 13 may be a rubber of low rigidity or a resin, for example. On the other hand, in place thereof, a structure also can be considered in which a gas portion (for example, air, etc.) and a delay portion for the cooling liquid are provided within the accumulator. The accumulator 12 or 13 may be provided with a supply opening for supplying the cooling liquid therethrough and an exit opening (not shown in the figure) for discharging the cooling liquid held in the accumulator 12 or 13.

Further, though the accumulator is disposed on the route between the pump 1 and the heat receiving jacket 2 in the present embodiment, more preferably from a viewpoint of effective down-sizing thereof, etc., the accumulator may be provided within the display device chassis 7 in the FIG. 1, as well as, on the route between the pump 1 and the heat receiving jacket 2. More preferably, it may be positioned downstream of a region where the heat radiation pipe 4 is disposed, from a viewpoint of protection from corrosion, etc.

Figure 5:
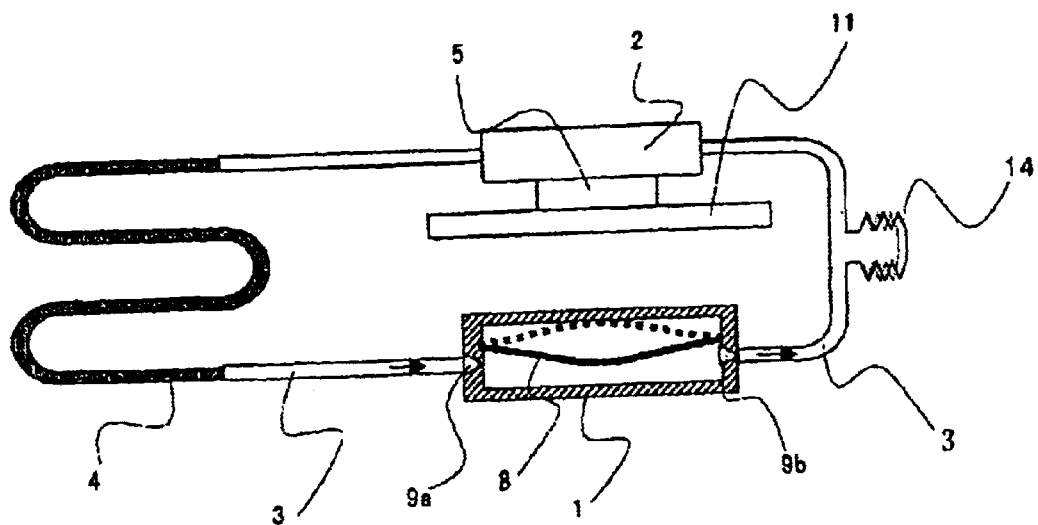
FIG. 5 is a diagram of the liquid cooling system according to a still further embodiment of the present invention.

FIG. 5 diagrammatically shows the liquid cooling system according to a third embodiment of the present invention. The structure of the system is almost equal to that of the second embodiment shown in FIG. 3, however, in this embodiment, a metal bellows 14 is used as the accumulator. Also, in this figure, solid lines and broken lines of the diaphragm 8 correspond to the respective shapes of the metal bellows 14. When the chamber of the pump 1 is compressed by means of the diaphragm 8, the check valve 9b is opened, and then the pressure is transferred to the metal bellows 14, which is expanded, as shown by the solid lines. With this expansion, the cooling liquid can flow out of the pump in the direction of arrow. In the present embodiment, the volume change of the metal bellows 14 is $\Delta Vs$, which is caused when the pressure P is applied thereto, and $\Delta Vs$ is equal or greater than $\Delta Vp$. Therefore, it is possible to draw out the characteristics or performances of the liquid cooling system with high efficiency, thereby to provide a system of low electric power consumption.

Figure 6:
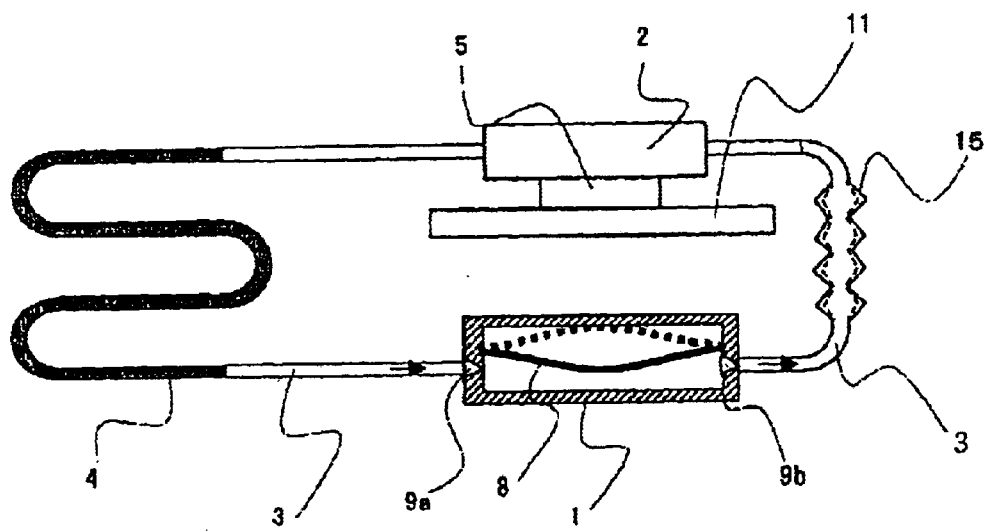
FIG. 6 is a diagram of the liquid cooling system according to the still another embodiment of the present invention.

Furthermore, in the present embodiment, though the metal bellows 14 is attached to the connector pipe 3 as a branch off of the main fluid passage, the metal bellows 14 may be connected to the connector pipe 3 in series, as shown in FIG. 6, so as to insert it into a closed loop, thereby obtaining the same effect, as far as $\Delta Vs$ being equal to or greater than the $\Delta Vp$. And, for example, stainless steel and phosphor bronze can be used up, as the material of the metal bellows 14.

Figure 7:
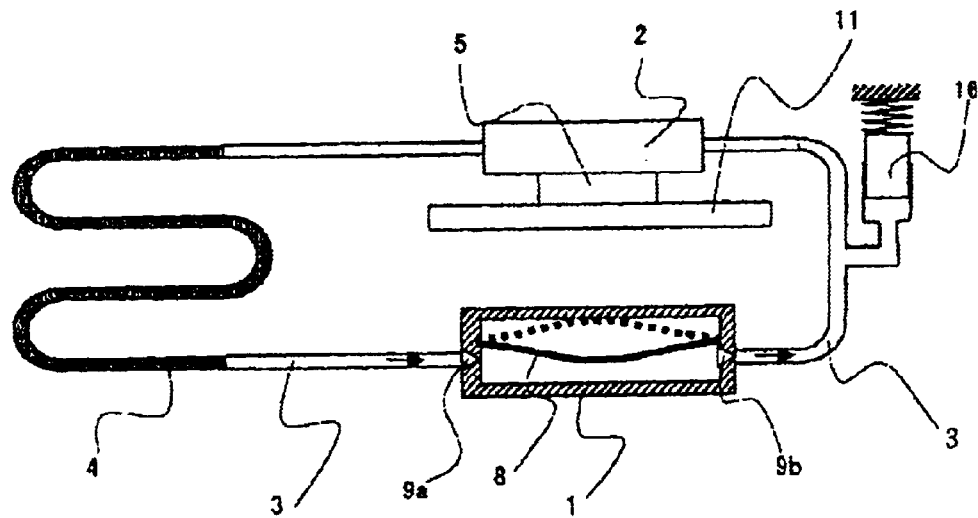
FIG. 7 is a diagram of the liquid cooling system according to yet another other embodiment of the present invention.

FIG. 7 diagrammatically shows the liquid cooling system according to a fifth embodiment of the present invention.

The structure of the system is almost equal to that of the second or third embodiment, however a piston mechanism 16 is provided as the accumulator. The piston mechanism 16 has a structure similar to that of an injector or syringe, in which a piston is pushed at one end thereof by means of a spring. When the chamber of the pump 1 is compressed by means of the diaphragm 8, the check valve 9b is opened, and the pressure is transferred to the piston mechanism 16, which causes the piston to be shifted upward against the pressure of the spring, as seen in FIG. 7. With this shifting, the cooling liquid can flow from the pump in the direction of the arrow. In the present embodiment, the volume change of the piston mechanism 16 is ΔVs, when the pressure P is applied thereto, and ΔVs can be made equal to or greater than ΔVp by suitably adjusting the strength of the spring. Therefore, it is possible to draw out the characteristics or performance of the liquid cooling system with high efficiency, so as to provide a system of low electric power consumption. As the material of the piston mechanism 16, a metal, a resin and glass can be selected, however, it is also possible to use an injector or syringe that is available on the market. The spring used in the piston mechanism 16 can be, for example, a plate spring, an air spring, etc., rather than the coil spring shown in FIG. 7.

Figure 8:
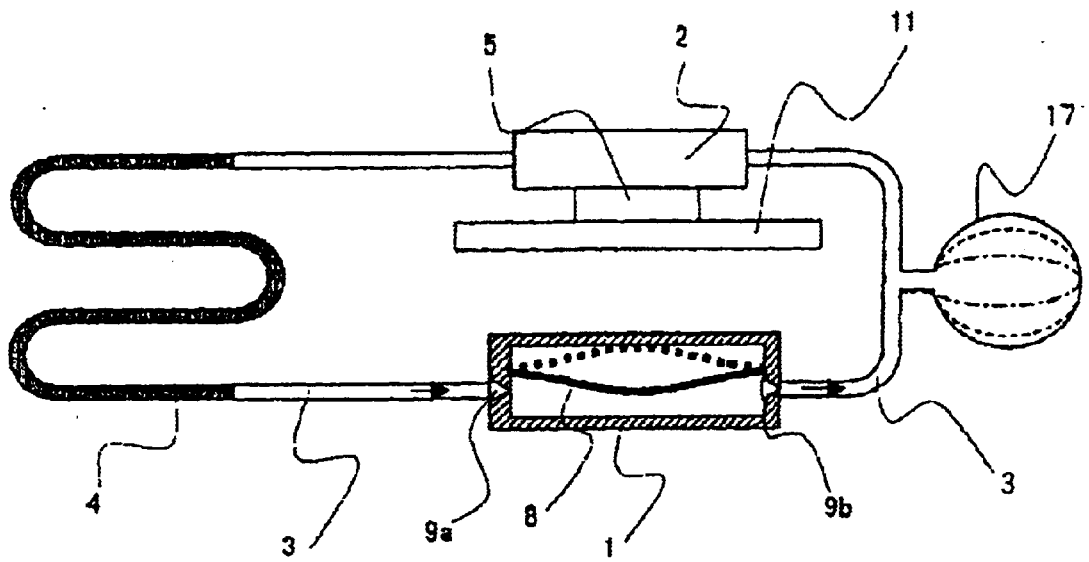
FIG. 8 is a diagram of the liquid cooling system according to another embodiment of the present invention.

FIG. 8 diagrammatically shows the liquid cooling system according to a fifth embodiment of the present invention. The structure of the system is almost the same as that of the second embodiment, however the closed system is filled with cooling liquid at a predetermined pressure. In this figure, the solid lines and broken lines of the diaphragm 8 correspond to those of an accumulator 17. Also, the original shape (a shape which results when there is no difference in pressure between the out side and inside thereof) of the accumulator 17 is shown by a one-chained dotted line. Since the cooling liquid which fills the closed system is under pressure, the shape of the accumulator 17 is larger than the original shape even when the diaphragm 8 of the pump 1 is at the position shown by broken lines. Even if the cooling liquid is pressurized, it is possible to obtain the same effect to that of the first embodiment, if the volume change ΔVs of the accumulator 17, which is produced when the pressure P is applied thereto, is equal or greater than ΔVp; therefore, it is possible to draw out the characteristics or performance of the liquid cooling system with high efficiency, thereby to construct a system of low electric power consumption.

As a distinctive effect according to the present embodiment, it should be pointed out that the cooling liquid needs to be protected from bubbles that are generated from a long-time use thereof in the system. If the pressure within the system is greater than atmospheric pressure, using rubber or resin as the material of the connector 3 or the accumulator 17 causes a diffusion of molecules of the cooling liquid therein, though only very small amounts, thereby minute amounts of cooling fluid diffuse away into the atmosphere over time. If the pressure within the system is lower than atmospheric pressure, the air diffuses into the rubber or resin, so as to sneak into the flow passage; therefore, there is a possibility of generating bubbles therein. The bubbles may disturb or obstruct the operation of the check valve, therefore, it is important to prevent this from occurring in the present system.

Further, it is needless to say that the effect, which is completely the same as that of the present embodiment, can be obtained by filling up the system with a cooling liquid that is under pressure, even in the first, the third and the fourth embodiments.

Figure 9:
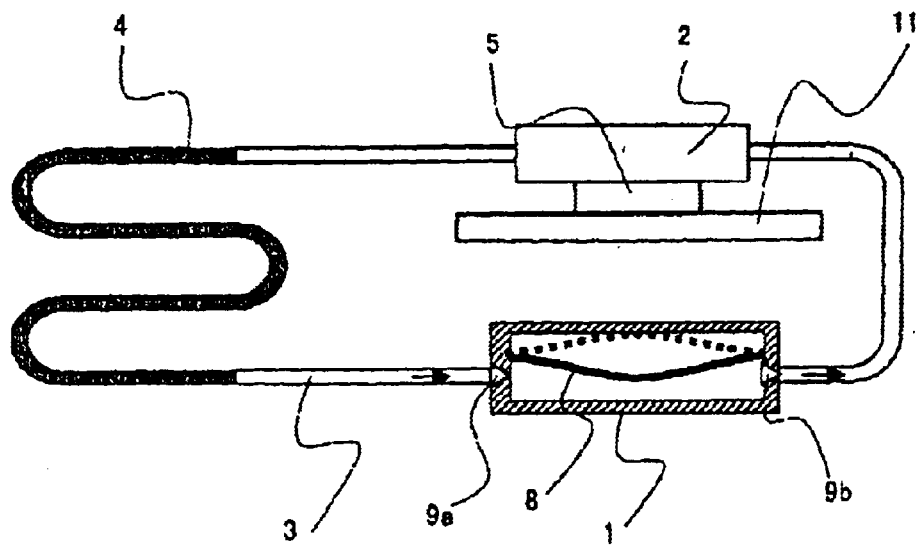
FIG. 9 is a diagram of the liquid cooling system according to another embodiment of the present invention.
Figure 10:
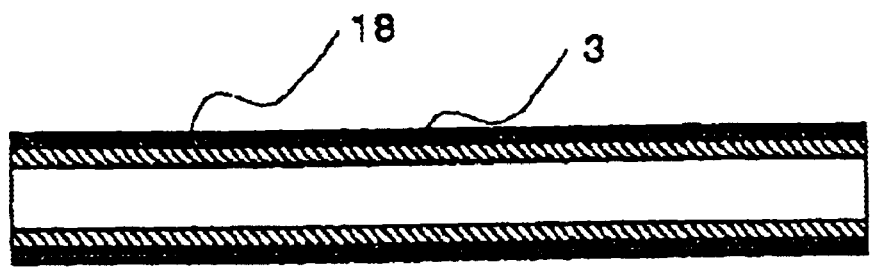
FIG. 10 is a cross-sectional view of a connection pipe used in any embodiment of the present invention.

FIG. 9 diagrammatically shows the liquid cooling system according to a sixth embodiment of the present invention. The structure of the system is almost the same as that of the first embodiment, however soft rubber or resin is used as the material of the connector pipe 3 in the present embodiment. And, the surface of the connector pipe 3 is covered or coated with a metal film 18, as shown in FIG. 10. The distinctive effect of the present embodiment is that, since the connector pipe 3 is made of a soft material, other parts, such as the pump, the heat receiving jacket, the heat radiation pipe, etc., can be positioned freely. Also, it is possible to fold the portion which comprises the heat radiation route repetitively.

Figure 11:
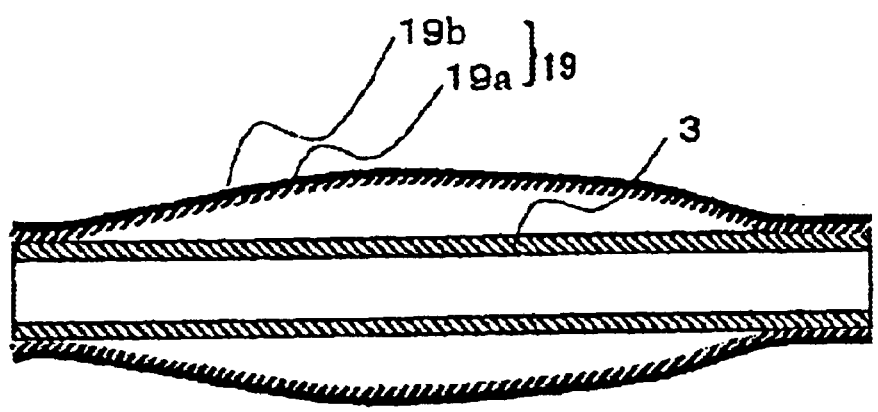
FIG. 11 is a cross-sectional view of a connection pipe used in any embodiment of the present invention.

However, if rubber or resin is used, the molecules of the cooling liquid tend to diffuse therein, as was explained in connection with the fifth embodiment, therefore, the cooling liquid may diffuse away into the atmosphere. According to the present embodiment, since the surface of the connector pipe 3 is covered with the metal film 18, it is possible to prevent loss of the cooling liquid from the system. Also, as shown in FIG. 11, the same effect can be obtained by covering the connector pipe with a resin sheet 19, including a metal film 19a and a resin film 19b. In this case, it does not matter if there a space is formed between the resin sheet 19 and the connector pipe 3, however, they must closely adhere to each other at both ends thereof.

Figure 12:
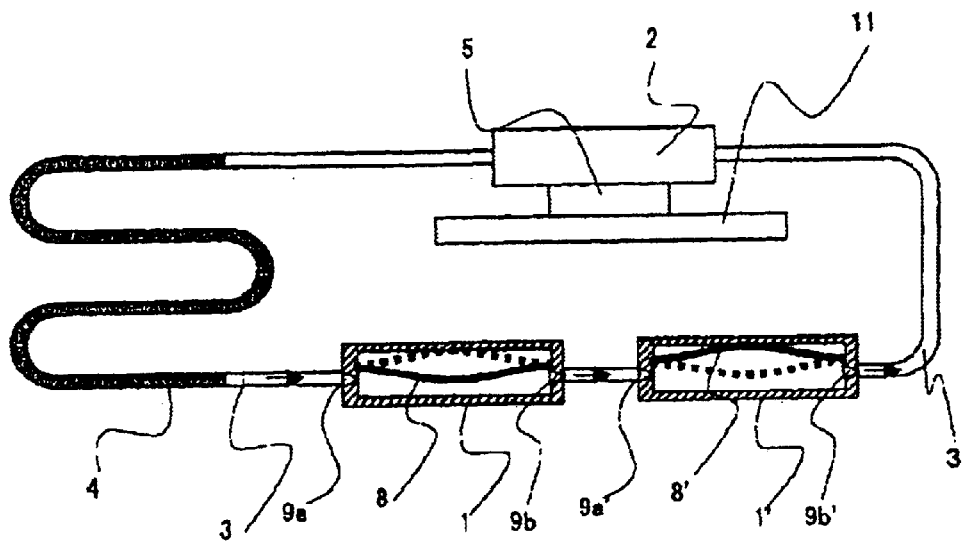
FIG. 12 is a diagram of the liquid cooling system according to further other embodiment of the present invention.
Figure 13:
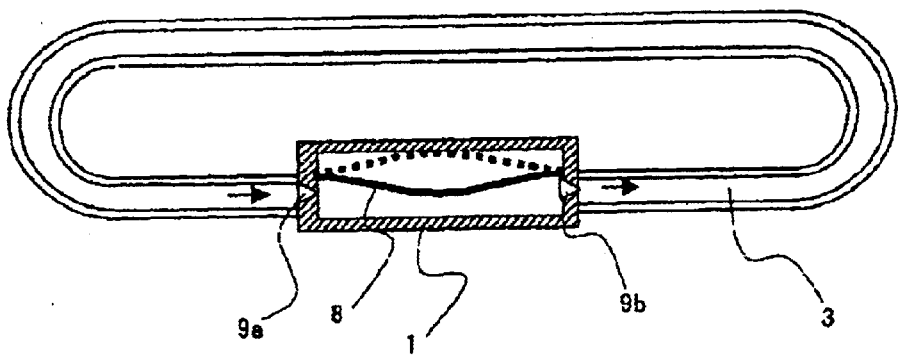
FIG. 13 is a diagram which illustrates the principle of the liquid cooling system of the present invention.
Figure 14:
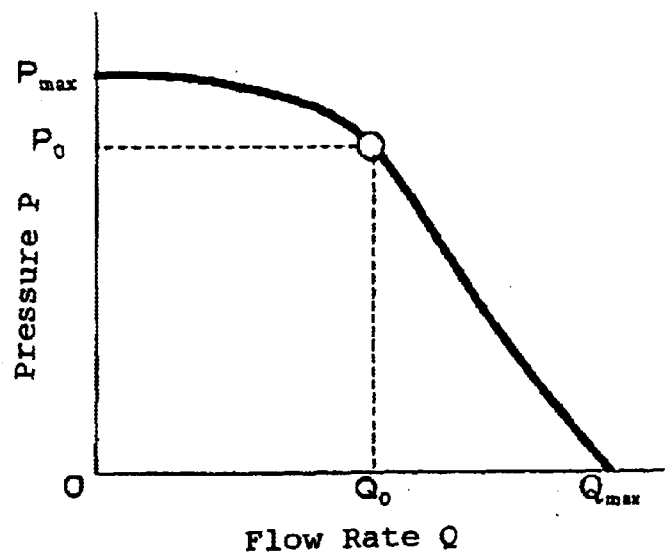
FIG. 14 is a graph showing a relationship between flow rate and the pressure of a pump which is used in the liquid cooling system, according to the embodiment of the present invention.
Figure 15:
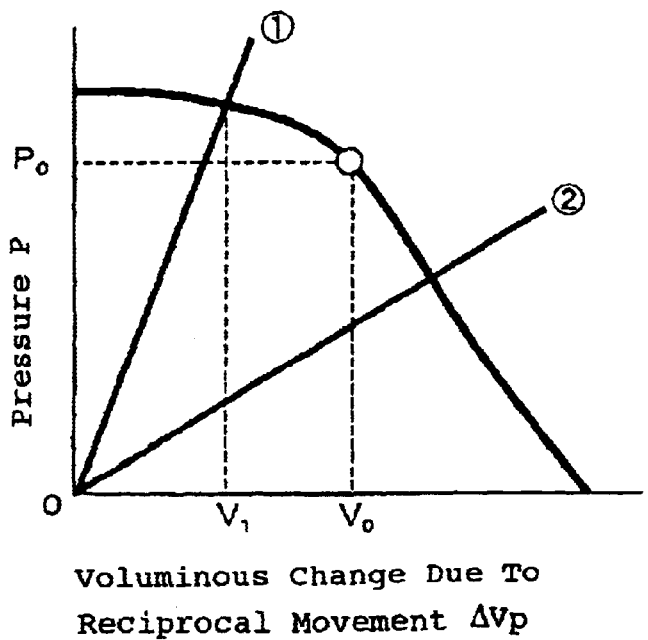
FIG. 15 is a graph showing a relationship between volume change and the pressure of the pump which is used in the liquid cooling system, according to the embodiment of the present invention.

FIG. 12 diagrammatically shows the liquid cooling system according to a seventh embodiment of the present invention. In the present embodiment, two pumps are provided in series, thereby forming a flow passage as a closed loop. Solid lines and broken lines of the diaphragms 8 and 8' correspond to each other. When the diaphragm 9 of the pump 1 is at the position shown by the solid line, so as to pressurize the cooling liquid, the diaphragm 8' of the pump 1' is at the position shown in the solid line, therefore the cooling liquid emitted from the pump 1 flows into the pump 1'. In this manner, since the two pumps are shifted in operation by 180 degree as to the phase of reciprocal movements of the diaphragms thereof, the cooling liquid can flow in the direction of arrows, therefore obtaining effects that are totally the same as those of the other embodiments, i.e., it is possible to draw out the characteristics or performance of the liquid cooling system with high efficiency, thereby to provide a system of low electric power consumption.

Furthermore, in the present embodiment, there is no need to provide an expansible portion in the flow passage, like the other embodiments; although it is possible to provide an accumulator in the system in common with that of the other embodiments.

However, since two pumps are used in the present embodiment, the pressure to which the cooling liquid is compressed becomes large, thereby increasing the flow rate; therefore, there is the distinctive effect that the cooling can be improved more than that of the other embodiments.

As was mentioned above, according to the present invention, since it is possible to draw out the characteristics or performance of the liquid cooling system with high efficiency, it is possible to provide a liquid cooling system that is ultra-small and thin in size, as well as one having a low electric power consumption; and, further, it is possible to install semiconductor element capable of generating high temperatures in a personal computer by applying the present system therein.

According to the present invention, as was fully explained above, it is possible to provide a liquid cooling system with low electric power consumption, that is able to cool down a body generating high heat, such as a semiconductor element used in an electronic apparatus that is small-sized and thin, or to provide a personal computer equipped with such a structure.

While we have shown and described several embodiments in accordance with our invention, it should be understood that the disclosed embodiments are susceptible of changes and modifications without departing from the scope of the invention. Therefore, we do not intend to be bound by the details shown and described herein, but intend to cover all such changes and modifications that fall within the ambit of the appended claims.

What is claimed is:

1. A liquid cooling system, comprising:
   a circulation pump of the pulsation type for circulating cooling liquid therethrough including an input portion for receiving cooling liquid and a separate output portion for supplying cooling liquid;
   a heat receiving jacket supplied with said cooling liquid and disposed to receive heat generated from a heat generating body;
   a heat radiation portion for radiating heat which is supplied by the cooling liquid passing through said heat receiving jacket; and
   a member for circulating the cooling liquid passing through said heat radiation portion into said pump so that said cooling liquid circulates within a closed flow passage, wherein
   $\Delta Vs$ is equal to or greater than $\Delta Vp$, with the inner volume change when said pump emits a pulsation therefrom being represented by $\Delta Vp$, the pressure caused by said volume change being represented by P, and the volume change due to said pressure P which occurs in the flow passage of the cooling liquid, other than in said pump, being represented by $\Delta Vs$.

2. A liquid cooling system as defined in claim 1, further comprising an accumulator, in which the volume change of the cooling liquid in the accumulator due to said pressure P is equal to or greater than $\Delta Vp$.

3. A liquid cooling system as defined in the claim 2, wherein said accumulator comprises a supply opening for supplying said circulating cooling liquid therethrough and a discharge opening for discharging said cooling liquid therethrough, and a chamber that maintains gas and said cooling liquid therein.

4. A liquid cooling system as defined in claim 2, wherein plural pumps are connected in series in said flow passage.

5. A liquid cooling system as defined in claim 4, wherein two of said plural pumps are operated to respectively produce emission of said cooling liquid that are 180° different in phase from each other.

6. A liquid cooling system as defined in claim 5, wherein said pumps emit the cooling liquid by reciprocal movement of a member in said pump is caused by bending or flexible of a diaphragm.

7. A liquid cooling system as defined in the claim 1, wherein said cooling liquid is pressurized at a pressure that is equal to or greater than that of the atmosphere.

8. A liquid cooling system as defined in claim 1, wherein at least a portion of the circulating passage for carrying said cooling liquid therein is formed of a flexible material.

9. A liquid cooling system as defined in claim 1, wherein the cooling liquid in said closed flow passage is pressurized at a pressure higher than atmospheric pressure.

10. A liquid cooling system as defined in claim 9, wherein at least a portion of said circulating passage is formed of a rubber or resin material.

11. A liquid cooling system as defined in claim 10, wherein said portion of said circulating passage which his formed of rubber or resin material is coated with a metal film.

12. A personal computer, comprising:
   a semiconductor element;
   a signal input portion;
   a display device; and
   a liquid cooling system, including:
      a circulation pump for circulating cooling liquid therethrough including an input portion for receiving cooling liquid and a separate output portion for supplying cooling liquid;
      a heat receiving jacket supplied with said cooling liquid and positioned to receive heat generated within said semiconductor element;
      a heat radiation portion for radiating heat which is supplied by the cooling liquid passing through said heat receiving jacket; and
      a member for circulating the cooling liquid passing through said heat radiation portion into said pump so that said cooling liquid circulates within a closed flow passage, wherein
      $\Delta Vs$ is equal to or greater than $\Delta Vp$, with the inner volume change when said pump emits the cooling liquid therefrom being represented by $\Delta Vp$, the pressure caused by said volume change being represented by P, and the volume change due to said pressure P which occurs in the flow passage of the cooling liquid, other than in said pump, being represented by $\Delta Vs$.

13. A personal computer as defined in the claim 12, wherein said liquid cooling system further comprises an accumulator, in which the volume change of the cooling liquid in the accumulator due to said pressure P is equal to or greater than $\Delta Vp$.

14. A personal computer as defined in the claim 12, wherein said cooling liquid is pressurized at a pressure that is equal to or greater than that of the atmosphere.

15. A personal computer, comprising:
   a main body including a semiconductor element and a signal input portion;
   a display device having a display portion connected with said main body through a movable mechanism; and
   a liquid cooling system, including:
      a circulation pump for circulating cooling liquid therethrough including an input portion for receiving cooling liquid and a separate output portion for supplying cooling liquid;
   a heat receiving jacket disposed within said main body and supplied with said cooling liquid, said heat receiving jacket being positioned to receive heat generated within said semiconductor element;
   a heat radiation portion being disposed on a back surface of said display portion of said display device for radiating heat which is supplied by the cooling liquid passing through said heat receiving jacket;
   a member for circulating the cooling liquid passing through said heat radiation portion into said pump so that said cooling liquid circulates within a closed flow passage; and
   an accumulator connected to said closed flow passage and having a supply opening for supplying said circulating cooling liquid therethrough, a discharge opening for discharging said cooling liquid therethrough, and a chamber that maintains gas and said cooling liquid therein, wherein the amount of the cooling liquid maintained within said accumulator changes in response to emission of the cooling liquid from said pump.

16. A personal computer as defined in the claim 15, wherein $\Delta Vs$ is equal to or greater than $\Delta Vp$, with the inner volume change when said pump emits the cooling liquid therefrom being represented by $\Delta Vp$, the pressure caused by said volume change being represented by P, and the volume change due to said pressure P in the flow passage of the cooling liquid, other than said pump, being represented by $\Delta Vs$.

17. A personal computer, comprising:

a semiconductor element;

a signal input portion;

a display device; and a liquid cooling system, including:

an emission circulation pump for circulating cooling liquid therethrough including an input portion for receiving cooling liquid and a separate output portion for supplying cooling liquid;

a heat receiving jacket supplied with said cooling liquid and positioned to receive heat generated within said semiconductor element;

a heat radiation portion for radiating heat which is supplied by the cooling liquid passing through said heat receiving jacket;

an accumulator having a supply opening for supplying said circulating cooling liquid therethrough, a discharge opening for discharging said cooling liquid therethrough, and a chamber for maintaining gas and said cooling liquid therein; and a member for or circulating the cooling liquid passing through said heat radiation portion into said pump so that said cooling liquid circulates within a closed flow passage, wherein the amount of cooling liquid maintained within said accumulator changes in response to emission of the cooling liquid from said pump.

18. A liquid cooling system, comprising:

a circulation pump for circulating cooling liquid therethrough including an input portion for receiving cooling liquid and a separate output portion for supplying cooling liquid;

a heat receiving jacket supplied with said cooling liquid from said pump and disposed to receive heat generated from a heat generating body;

a heat radiation portion for radiating heat which is supplied by the cooling liquid passing through said heat receiving jacket;

a member for circulating the cooling liquid passing through said heat radiation portion into said pump so that said cooling liquid circulates within a closed flow passage; and an accumulator disposed along said closed flow passage.

19. A liquid cooling system as defined in claim 18, wherein said cooling liquid is pressurized at a pressure that is equal to or greater than that of the atmosphere.

20. A liquid cooling system as defined in claim 18, wherein said accumulator comprises at least one opening for at least one of supply and discharge of said circulating cooling liquid, and a chamber that maintains gas and said cooling liquid therein.

21. A liquid cooling system as defined in claim 20, wherein said accumulator is disposed along said closed flow passage from said heat radiation portion to said heat receiving jacket.

22. A liquid cooling system as defined in claim 20, wherein said at least one opening of said accumulator includes a supply opening for supplying said circulating cooling liquid therethrough and a discharge opening for discharging said cooling liquid therethrough.

\* \* \* \* \*